No. 720,866. PATENTED FEB. 17, 1903.
E. B. WELLES.
WHIFFLETREE CLIP.
APPLICATION FILED AUG. 1, 1902.
NO MODEL.
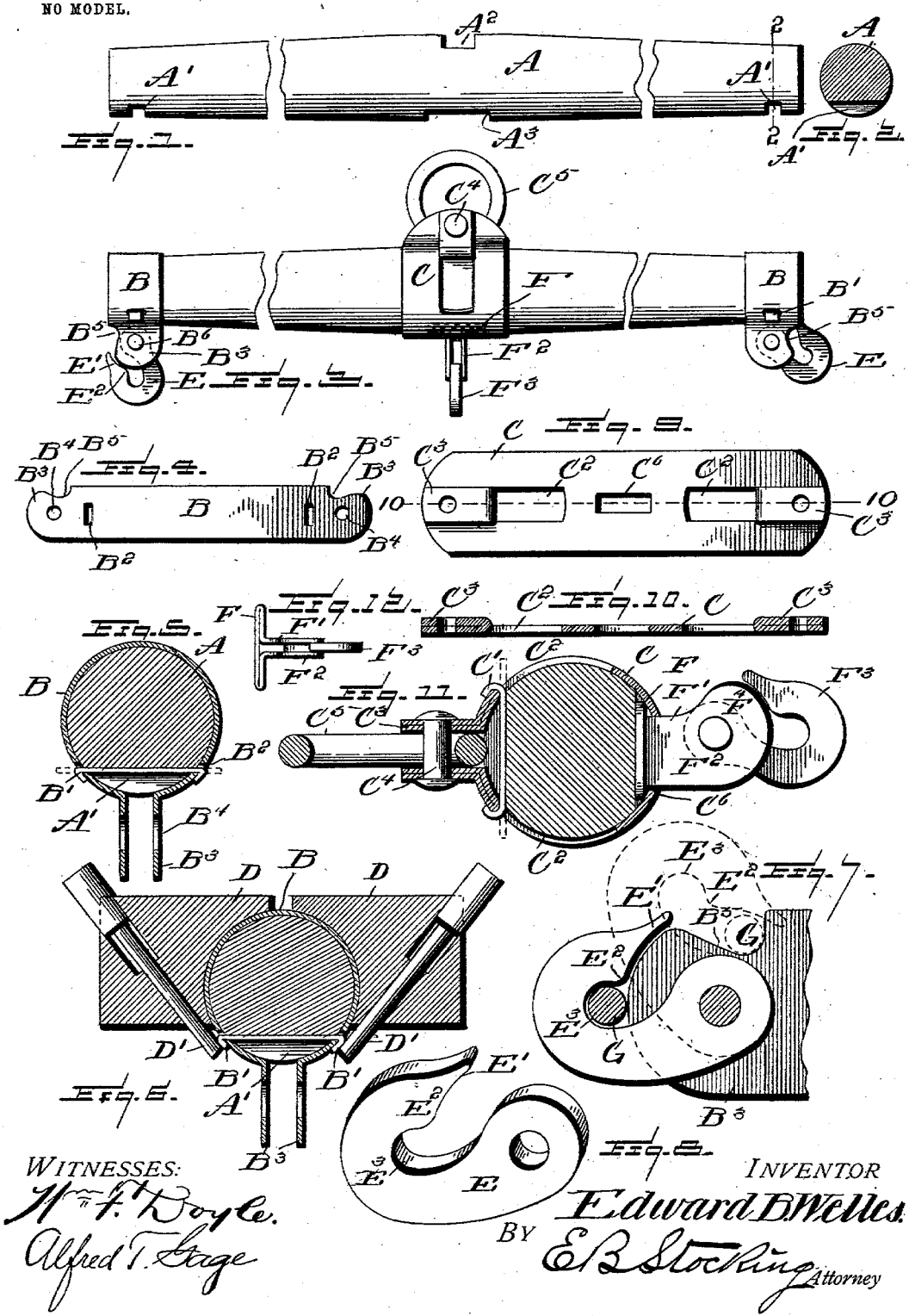
WITNESSES:
W. F. Doyle.
Alfred T. Stage.
INVENTOR
Edward B. Welles.
BY E. B. Stocking
Attorney

UNITED STATES PATENT OFFICE.

EDWARD B. WELLES, OF ASHEVILLE, NORTH CAROLINA, ASSIGNOR OF ONE-THIRD TO THOMAS G. CLARK, OF ASHEVILLE, NORTH CAROLINA.

WHIFFLETREE-CLIP.

SPECIFICATION forming part of Letters Patent No. 720,866, dated February 17, 1903

Application filed August 1, 1902. Serial No. 117,997. (No model.)

*To all whom it may concern:*

Be it known that I, EDWARD B. WELLES, a citizen of the United States, residing at Asheville, in the county of Buncombe and State of North Carolina, have invented certain new and useful Improvements in Whiffletree-Clips, of which the following is a specification, reference being had therein to the accompanying drawings.
This invention relates to whiffletree-clips, and has for an object to provide an improved form of clip for securing the hook to a tree and also a novel and improved construction of hook adapted to coöperate with a guard carried by the clip.

Other and further objects and advantages of the invention will be hereinafter set forth and the novel features thereof defined by the appended claims.
In the drawings, Figure 1 is a plan of a tree to which the invention may be applied; Fig. 2, a vertical section thereof on the line 2 2 of Fig. 1; Fig. 3, a plan of the tree complete; Fig. 4, a similar view of the blank forming the end clips; Fig. 5, a vertical section through this clip secured in position; Fig. 6, a similar section showing the means for applying the clip and securing-plate. Fig. 7 is a horizontal section illustrating the hook and guard;
Fig. 8, a detail perspective of the hook; Fig. 9, a plan of the blank for the center clip; Fig. 10, a central vertical section on the line 10 10 of Fig. 9; Fig. 11, a vertical section through the center clip, showing the application of a doubletree-hook thereto; and Fig. 12 is a plan of the holding-plate for said doubletree-hook.

Like letters of reference refer to like parts in the several figures of the drawings.
The letter A designates a tree, either a single or double tree, which is provided at its opposite ends with a kerf or slot A' therein to receive the securing means for the clip B and centrally between its ends with a slot $A^2$ to receive the securing means for the center clip C. When a doubletree-hook is used, an additional slot $A^3$ may be provided upon the opposite face of the tree from the slot $A^2$, and each of these slots is simply for the purpose of providing a flat bearing-face for the securing-plate used in connection with the clips.

The end clips B are formed of a blank, as shown in Fig. 4, provided at opposite sides of its center with slots or apertures therethrough to permit the passage of a securing-plate B' and upon each end with guard portions $B^3$, having therein a bolt-aperture $B^4$ and upon one edge a recess $B^5$ to coöperate with the hook, as hereinafter described. This clip is secured to the tree by being compressed upon the same under pressure, when the plate B' is passed through the opposite apertures $B^2$ and its ends bent downward upon the clip to firmly lock the same in position under such tension or pressure that the wood of the tree is compressed beyond the point of shrinkage. This result may be obtained by various devices; but as showing a preferred construction for accomplishing the result I have illustrated in Fig. 6 opposite compressing-dies D, which compress the wood beyond the point of shrinkage, and the plate B' is then bent downward at its end to secure the clip in position by means of the plungers D', mounted in the dies to engage the opposite ends of the plate. The clip as thus applied may be used for any desired purpose; but when used as an end clip a hook E is pivotally mounted therein by means of a bolt $B^6$ and the point E' of said hook adapted to travel adjacent to the curved outer edge of the guards $B^3$, between which it is pivoted, while this point is also provided with a lip $E^2$, so as to form a recess or throat $E^3$ of substantially the diameter of the ring or link adapted to be held by the hook, as shown in Fig. 7.

The center clip C is secured in position similarly to the clip B by means of a plate C', passed through apertures $C^2$ in the clip C and bent downward thereon, while the material cut from these apertures is bent downwardly upon itself, as at $C^3$, forming a double thickness to receive the pivoting-bolt $C^4$ for the connecting means, which may be a ring $C^5$ or any other suitable device. When it is desired to provide a supplementary plate for securing a doubletree-hook in position, this clip may also be provided with a center aperture $C^6$, through which the shank F' of a holding-plate F may pass, as shown in Fig. 11. This holding-plate, as shown in Fig. 12, is composed of a blank of metal bent upon itself and disposed behind the body of the clip C, with a shank F' thereof extending through the aperture C⁶, so that the guard-plates F², between which the hook F³ is pivotally mounted by means of a bolt F⁴, will extend at substantially a right angle to the whiffletree-hooks adapted to connect to the traces. This hook and guard-plate are similar in construction to those hereinbefore described.

In the operation of the invention the ring or link to be connected to the tree is first placed in the recess B⁵ in the guard-plates B³ and the hook then thrown into the position shown by dotted lines in Fig. 7 and by full lines at the right of Fig. 3. The link, as indicated at G, is then moved upwardly into the throat E³ of the hook and past the lip E², so that when the hook is returned to its full-line position in Fig. 7 and at the left of Fig. 3 the link G is carried thereby in contact with the curved edge of the guards B³, so that there is no possibility of accidental disengagement, while the parts can be quickly and readily disconnected by the driver by simply swinging the hook to one side, which carries the link with it and into the recess B⁵, when the hook is returned to its full-line position and the link may be removed to disconnect the trace or other part attached to the hook. It will also be observed that the means for securing the clip in its position effectually prevents the removal of the same or its loosening through shrinkage of the material of the tree and at the same time forms a positive lock to prevent an endwise movement of the clip upon the tree, thus producing a simple, efficient, and economically-manufactured clip to which any device may be attached and also a hook which can be applied by other forms of clip and secure the advantages hereinbefore set forth.

It will be obvious that changes may be made in the details of construction and configuration without departing from the spirit of the invention as defined by the appended claims.

Having described my invention and set forth its merits, what I claim, and desire to secure by Letters Patent, is—

1. In a device of the class described, a body portion, a clip-plate secured thereto to embrace the body, and a laterally-extending securing-plate passing through the opposite sides of the clip and bent downward thereon; substantially as specified.

2. In a device of the class described, a body portion, a clip-plate secured thereto to embrace the body, a laterally-extending securing-plate passing through the opposite sides of the clip and bent downward thereon, guards formed upon the free ends of said clip and provided with a recess at one side, and a pivot passing through said guards; substantially as specified.

3. In a device of the class described, a body portion, a clip-plate secured thereto to embrace the body, a laterally-extending securing-plate passing through the opposite sides of the clip and bent downward thereon, guards formed upon the free ends of said clip and provided with a recess at one side, a pivot passing through said guards, and a hook mounted upon said pivot and provided with a point adapted to travel concentric with and adjacent to the edge of the guards; substantially as specified.

4. In a device of the class described, a clip-plate provided with apertures at opposite sides of its center and pivot-apertures at its ends, a curved body provided with a kerf upon one face and upon which said clip is applied, and a securing-plate passed through said clip and kerf and having its free ends bent downward upon the clip; substantially as specified.

5. In a whiffletree, a center clip comprising a plate having portions cut away and bent upon the body of the plate, and a securing-plate passed through said cut-away portions and bent upon the body of the plate; substantially as specified.

6. In a whiffletree, a center clip comprising a plate having portions cut away and bent upon the body of the plate, a securing-plate passed through said cut-away portions and bent upon the body of the plate, and a supplementary guard-plate having a body portion disposed upon one side of said clip-plate and a shank extending through an aperture therein; substantially as specified.

7. In a whiffletree, a body having kerfs or grooves at opposite ends and an intermediate groove upon the opposite face from the end grooves, pivoting-clips upon the opposite ends of said tree having securing means passed through said kerfs, an intermediate clip embracing the body of the tree, and securing means therefor passing through a kerf in the tree; substantially as specified.

In testimony whereof I affix my signature in presence of two witnesses.

EDWARD B. WELLES.

Witnesses:
  T. G. CLARK,
  CECILE CUTTER.